(No Model.)

E. B. BELLINGER.
CULTIVATOR.

No. 290,960. Patented Dec. 25, 1883.

WITNESSES:
Chas. Nida.
C. Sedgwick.

INVENTOR:
E. B. Bellinger
BY Munn & Co.
ATTORNEYS.

UNITED STATES PATENT OFFICE.

EARLL BUTTERFIELD BELLINGER, OF KALAMAZOO, ASSIGNOR TO HIMSELF AND HARVEY FERNANDO BELLINGER, OF BARRY, MICHIGAN.

CULTIVATOR.

SPECIFICATION forming part of Letters Patent No. 290,960, dated December 25, 1883.

Application filed May 22, 1883. (No model.)

*To all whom it may concern:*

Be it known that I, EARLL BUTTERFIELD BELLINGER, of Kalamazoo, in the county of Kalamazoo and State of Michigan, have invented certain new and useful Improvements in Cultivators, of which the following is a full, clear, and exact description.

Reference is to be had to the accompanying drawings, forming part of this specification, in which similar letters of reference indicate corresponding parts in both the figures.

Figure 1:
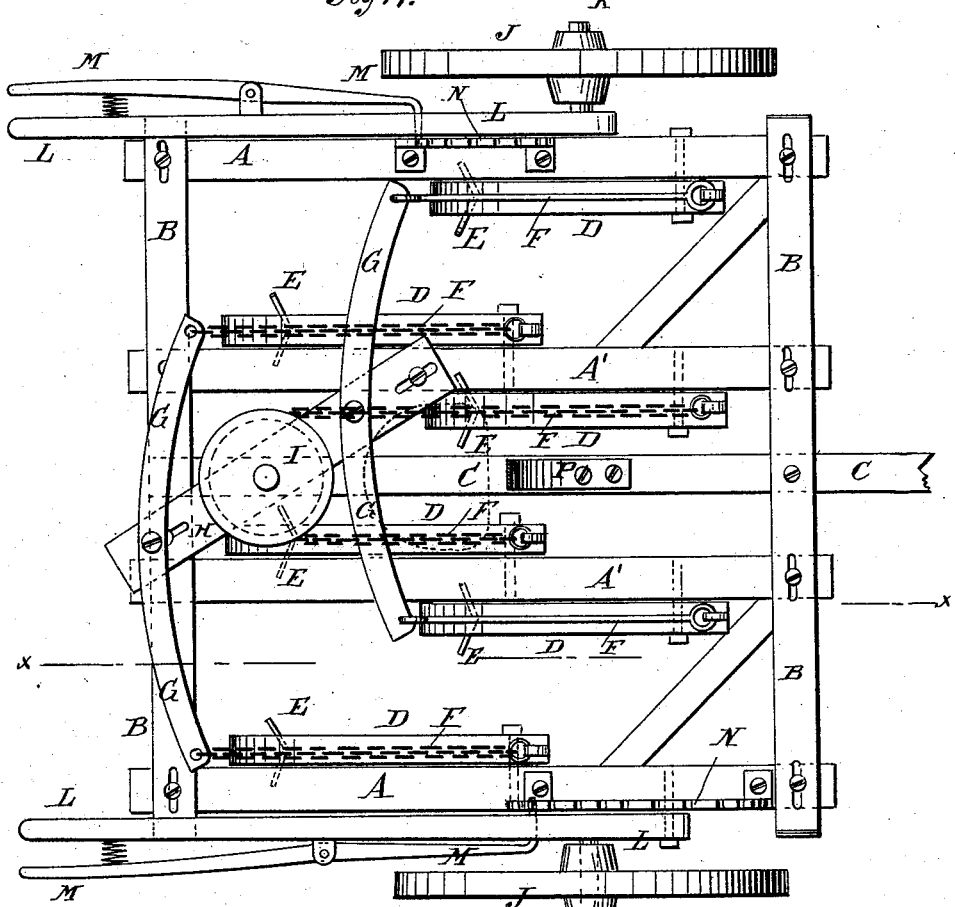
Figure 2:
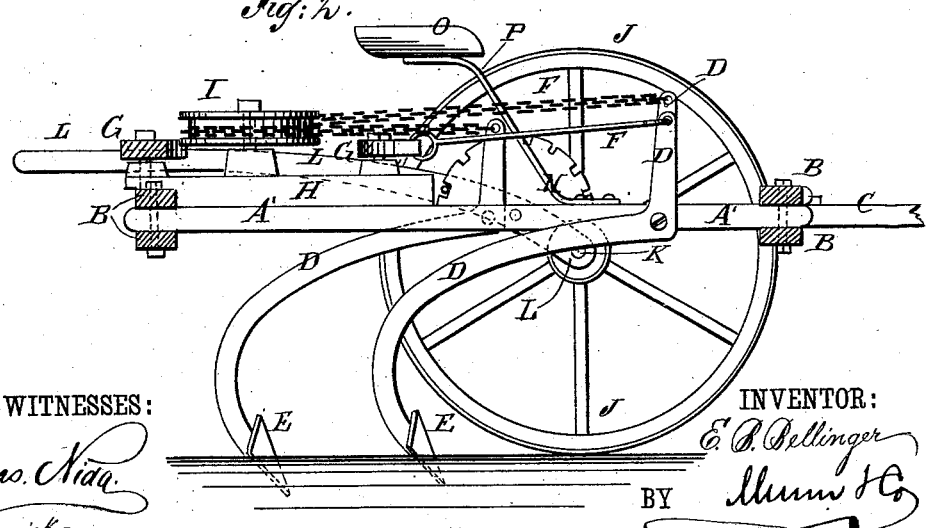

Figure 1 is a plan view of my improvement. Fig. 2 is a sectional side elevation of the same, taken through the line $xx$, Fig. 1.

The object of this invention is to promote convenience and efficiency in operating cultivators.

The invention relates to a cultivator constructed with a frame provided with pivoted standards made with curved lower parts and vertical upper parts, and connected at their upper ends in pairs by rods or chains and pivoted bars. The frame is supported adjustably upon wheels which are journaled to levers pivoted to the said frame, and held in place by lever-pawls and catch-plates, as will be hereinafter fully described.

A A' represent the longitudinal bars of the frame, the ends of which are inserted between and secured to pairs of cross-bars B, attached to the upper and lower sides of the tongue C, at its rear end, and at a suitable distance from its rear end. The cross-bars B are slotted to receive the fastening-bolts, so that the said bars can be adjusted wider apart or closer together, as may be desired.

To the sides of the bars A A' are pivoted the plow-standards D, the lowest parts of which are curved rearward and downward, and to their lower ends are attached the plows E. The upper parts of the standards D are vertical, and are connected in pairs, one or two standards being interposed between the standards of each pair, as may be desired. To the upper ends of the standards of each pair are attached the forward ends of two rods or chains, F, the rear ends of which are attached to the opposite ends of a curved bar, G. The bars G are pivoted at their centers to the frame A B, or to bar H, attached to the said frame. With this construction, should one of the plows strike an obstruction, it will be stopped and made to rise and the other plow of that pair will be forced forward and downward until the first plow has passed the obstruction, when the said first plow will be at once forced into the ground and forced forward by the increased resistance encountered by the second plow, caused by the said second plow being forced deeper into the ground until the two plows again become parallel. In the case of the two middle plows the pivoted bar G may be replaced by a pulley, I, around which the chain F passes, so that the said plows can be readily detached, or their bars A' moved farther apart when it is desired to use the machine for cultivating corn or other plants planted in rows. The frame A B is supported upon wheels J, the journals K of which are attached to levers L pivoted to the outer bars, A, of the said frame, so that the frame can be adjusted by operating the levers L to cause the plows to work at any desired depth in the ground, or to raise the said plows above the ground, as may be desired.

The levers L are held in any position into which they may be adjusted by spring-lever pawls M connected with them, and which engage with the teeth of a curved catch-bar or plate, N, attached to the outer bars, A.

O is the driver's seat, the standard P of which is attached to the tongue C or other suitable support, in such a manner as to bring the driver's weight over the middle part of the machine.

Having thus described my invention, what I claim as new, and desire to secure by Letters Patent, is—

1. The combination, with the right-angled standards D, of the chains F, and the middle pivoted bars or draft-equalizers, G, as shown and described.

2. The combination of the removable and adjustable center bars, A', the pivoted angular standards D, chains F, pulley I, and adjusting-bar H, with the frame, as and for the purpose described.

3. In a cultivator, the combination, with the frame A B, of the wheels J, the levers L, and pawls M, and catch-plate N, substantially as herein shown and described, whereby the said frame can be raised to and supported at any desired distance from the ground, as set forth.

EARLE BUTTERFIELD BELLINGER.

Witnesses:
WILLIAM BALLANTINE,
GEORGE M. WEST.